(12) United States Patent
Mercier

(10) Patent No.: US 9,000,672 B2
(45) Date of Patent: Apr. 7, 2015

(54) CONNECTOR WITH SURGE PROTECTION STRUCTURE

(75) Inventor: Martin Mercier, Montréal (CA)

(73) Assignee: Koninklijkle Philips N.V., Eindhoven (NL)

( * ) Notice: Subject to any disclaimer, the term of this patent is extended or adjusted under 35 U.S.C. 154(b) by 0 days.

(21) Appl. No.: 14/113,381

(22) PCT Filed: Apr. 17, 2012

(86) PCT No.: PCT/IB2012/051898
§ 371 (c)(1),
(2), (4) Date: Oct. 23, 2013

(87) PCT Pub. No.: WO2012/147005
PCT Pub. Date: Nov. 1, 2012

(65) Prior Publication Data
US 2014/0042908 A1    Feb. 13, 2014

Related U.S. Application Data

(60) Provisional application No. 61/479,143, filed on Apr. 26, 2011.

(51) Int. Cl.
*H05B 33/08*     (2006.01)

(52) U.S. Cl.
CPC .......... *H05B 33/0887* (2013.01); *H05B 33/089* (2013.01); *Y02B 20/341* (2013.01)

(58) Field of Classification Search
USPC ...................................... 315/125; 361/42, 48
See application file for complete search history.

(56) References Cited

U.S. PATENT DOCUMENTS

| 5,099,380 | A | 3/1992 | Childers et al. |
| 7,510,429 | B1 * | 3/2009 | Savicki et al. ................ 439/535 |
| 2003/0099073 | A1 * | 5/2003 | Anamura et al. ................ 361/42 |
| 2004/0033712 | A1 * | 2/2004 | Parsadayan et al. ......... 439/341 |
| 2006/0221530 | A1 | 10/2006 | Chappie et al. |
| 2007/0259548 | A1 * | 11/2007 | Byrne .......................... 439/215 |
| 2010/0327766 | A1 * | 12/2010 | Recker et al. ................ 315/291 |
| 2011/0057572 | A1 | 3/2011 | Kit et al. |

FOREIGN PATENT DOCUMENTS

| CN | 201636674 U | 11/2010 |
| CN | 201674699 U | 12/2010 |
| JP | 2297874 A | 12/1990 |
| JP | 2306556 A | 12/1990 |
| JP | 2008130420 A | 6/2008 |
| WO | 2010060420 A1 | 6/2010 |

OTHER PUBLICATIONS

Clearwater Tech: "Circuit Breakers & Surge Protection", April 13, 2010, pp. XP002681167.

* cited by examiner

*Primary Examiner* — Don Le
(74) *Attorney, Agent, or Firm* — Meenakshy Chakravorty

(57) ABSTRACT

A connector (10) is provided that includes a housing supporting a plurality of individual connection blocks (30, 35, 40) each having a power source input and an electronics output. Surge protection structure (51-54) is embedded within the housing of the connector (10) and is electrically coupled to at least some of the individual connection blocks (30, 35, 40). The connector (10) may be implemented within a lighting fixture (100).

13 Claims, 4 Drawing Sheets

CONNECTOR WITH SURGE PROTECTION STRUCTURE

TECHNICAL FIELD

The present invention is directed generally to a connector having surge protection structure. More particularly, various inventive methods and apparatus disclosed herein relate to a terminal block connector having surge protection structure integrated therein.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these LED lighting sources feature a power supply that may be sensitive to electrical stresses. For example, the power supply may be sensitive to power surges caused by lightning activity, unclean power, large electrical loads switching on/off, etc.

It has been proposed to implement stand alone surge protection devices in some LED-based lighting fixtures to protect the power supply. However, such stand alone surge protection devices suffer from one or more drawbacks. For example, such stand alone surge protection devices must be separately electrically connected to the lighting fixture, thereby requiring separate installation time and presenting the possibility of a bad or easily damageable connection. Also, for example, such stand alone surge protection devices may take up more space than desired in a lighting fixture and/or may cost more than desired.

Thus, there is a need in the art to provide a connector with integrated surge protection structure that may be implemented in a lighting fixture and that may optionally overcome one or more drawbacks associated with stand alone surge protection devices.

SUMMARY

The present disclosure is directed to inventive methods and apparatus for a connector having surge protection structure integrated therein. For example, a connector may include a housing supporting a plurality of individual connection blocks each having a power source input and an electronics output. Surge protection structure may be embedded within the housing of the connector and be electrically coupled to the individual connection blocks. The surge protection structure may optionally include a plurality of varistors each electrically interposed between two connection blocks. The connector may be implemented within a lighting fixture in some implementations.

Generally, in one aspect, a lighting fixture is provided that includes a light source, electronics electrically coupled to and powering the light source, and a terminal block connector. The terminal block connector has a housing supporting a live connection block, a neutral connection block, and a ground connection block. The live connection block, the neutral connection block, and the ground connection block each have a power source input and an electronics output electrically connected to the power source input. A plurality of varistors are embedded within the housing and include: a first varistor and a second varistor each electrically connected between the live connection block and the neutral connection block; a third varistor electrically connected between the live connection block and the ground connection block; and a fourth varistor electrically connected between the neutral connection block and the ground connection block.

In some embodiments at least one power source input includes adjustable clamping structure. In some versions of those embodiments the adjustable clamping structure includes a screw that is axially adjustable within the power source input.

In some embodiments each power source input and each electronics output includes adjustable clamping structure.

In some embodiments the housing includes a base and the live connection block, the neutral connection block, and the ground connection block are all supported atop the base. In some versions of those embodiments the varistors are substantially embedded within the base. In some versions of those embodiments the housing includes a plurality of walls extending upwardly from the base. Each of the walls extends adjacent at least one of the live connection block, the neutral connection block, and the ground connection block.

Generally, in another aspect, a lighting fixture is provided that includes a light source, electronics electrically coupled to and powering the light source, and a terminal block connector. The terminal block connector has a housing supporting a live connection block, a neutral connection block, and a ground connection block. The live connection block, the neutral connection block, and the ground connection block each have a high voltage power source input and a lighting fixture electronics output. Each lighting fixture electronics output is electrically connected to the power source input. The lighting fixture electronics output of at least the live connection block and the neutral connection block are electrically connected to the electronics. The terminal block connector further includes a first varistor electrically connected between the live connection block and the neutral connection block, a second varistor electrically connected between the live connection block and the ground connection block, and a third varistor electrically connected between the neutral connection block and the ground connection block. The first varistor, the second varistor, and the third varistor are inaccessibly enclosed within the housing.

In some embodiments the electronics include an LED driver. In some versions of those embodiments the electronics include a step-down transformer electrically interposed between the terminal block connector and the LED driver.

In some embodiments the electronics include an occupancy sensor.

In some embodiments the first varistor, the second varistor, and the third varistor may not be physically contacted without destroying the housing.

In some embodiments the first varistor, the second varistor, and the third varistor may not be physically contacted without disassembling the housing.

In some embodiments the terminal block further includes a fourth varistor electrically connected between the live connection block and the neutral connection block.

In some embodiments the light source is LED-based.

Generally, in another aspect, a lighting fixture is provided that includes a light source, electronics electrically coupled to and powering the light source, and a connector. The connector has a housing supporting a live connection block, a neutral connection block, and a ground connection block. The live connection block, the neutral connection block, and the ground connection block each have a high voltage power source input and a lighting fixture electronics output. Each lighting fixture electronics output is electrically connected to the power source input. The lighting fixture electronics output of at least the live connection block and the neutral connection block are electrically connected to the electronics. The connector further includes surge protection structure electrically connected to the live connection block, the neutral connection block, and the ground connection block. The surge protection structure is permanently embedded within the housing and not physically accessible without destroying the housing.

In some embodiments the surge protection structure includes at least two varistors.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs. It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Some lighting fixtures, such as LED-based lighting fixtures, may include a power supply or other electronic device(s) that may be sensitive to power surges or other electrical stresses. It has been proposed to implement stand alone surge protection devices in some LED-based lighting fixtures to protect the power supply. However, such stand alone surge protection devices suffer from one or more drawbacks. For example, such stand alone surge protection requires separate installation time and present the possibility of a bad or easily damageable connection. Also, for example, such stand alone surge protection devices may take up more space than desired and/or may cost more than desired.

Thus, there is a need in the art to provide a terminal block connector with integrated surge protection structure that may be implemented in a lighting fixture and that may optionally overcome one or more drawbacks associated with stand alone surge protection devices.

More generally, Applicants have recognized and appreciated that it would be beneficial to provide a terminal block connector having surge protection structure integrated therein. The terminal block connector may be implemented in a lighting fixture such as a LED-based lighting fixture.

In view of the foregoing, various embodiments and implementations of the present invention are directed to a connector having surge protection structure integrated therein.

Figure 1:
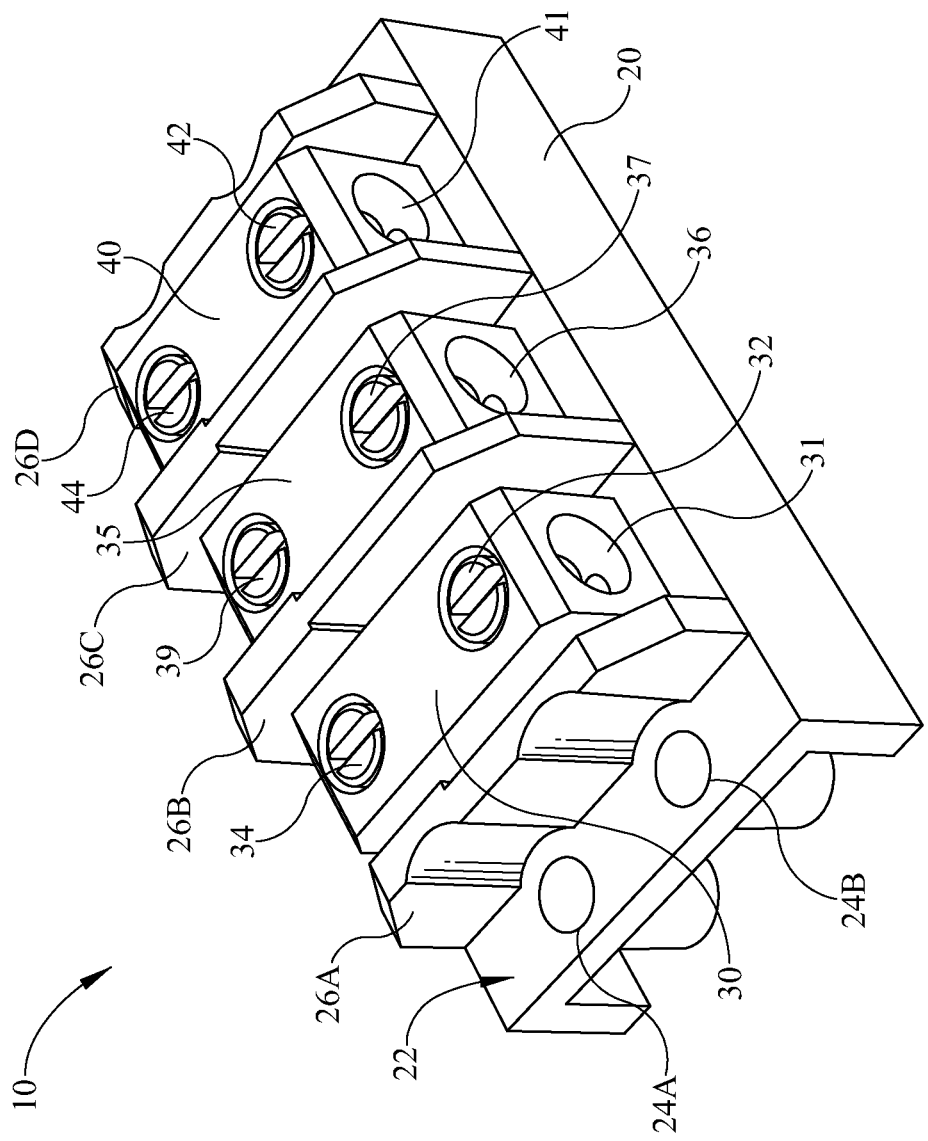
FIG. 1 illustrates a perspective view of a terminal block connector having integrated surge protection structure.
Figure 2:
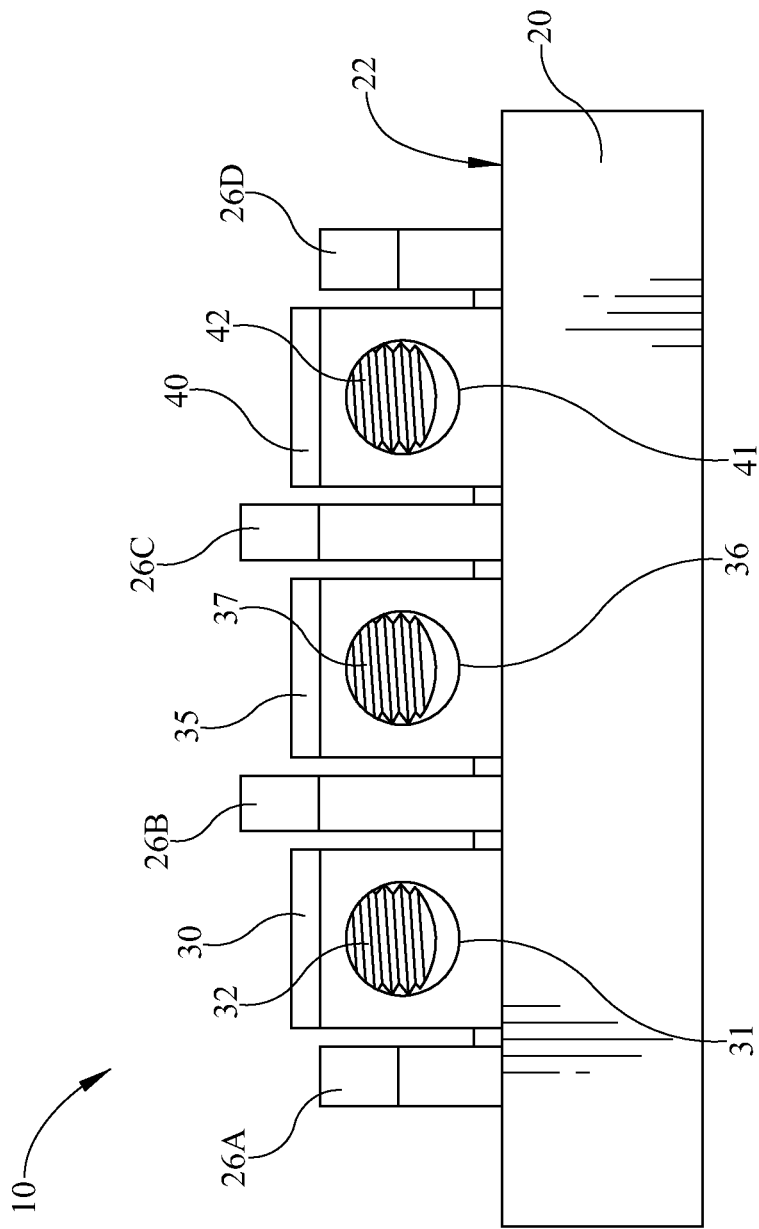
FIG. 2 illustrates a plan view of the terminal block connector of FIG. 1.
Figure 3:
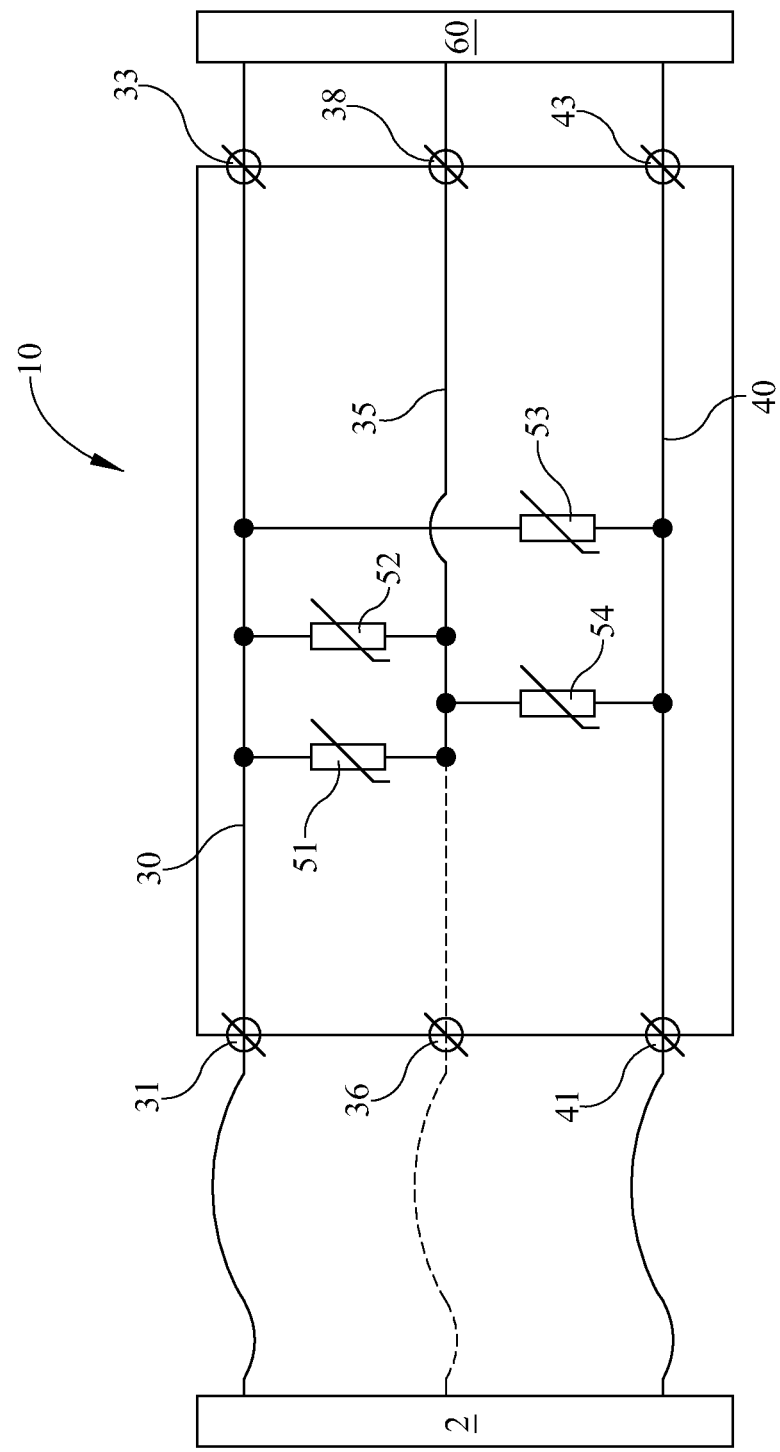
FIG. 3 illustrates a schematic of the terminal block connector of FIG. 1 electrically interposed between a power source and LED lighting fixture electronics.

Referring to FIG. 1 through FIG. 3, one embodiment of a terminal block connector 10 having integrated surge protection structure is illustrated. FIG. 1 and FIG. 2 illustrate a perspective view and plan view, respectively, of the terminal block connector 10. FIG. 3 illustrates a schematic of the terminal block connector 10 electrically interposed between a power source 2 and LED lighting fixture electronics 60.

The terminal block connector 10 includes a housing having a housing base 20 and an upper mounting surface 22. Four walls 26A-26D of the housing extend upwardly from the mounting surface 22 and are substantially perpendicular to the mounting surface 22. A pair of fastener openings 24A and 24B are provided through the housing exteriorly of outer wall 26A. The fastener openings 24A, 24B may receive a fastener therethrough that in turn may engage structure of a lighting fixture to thereby attach the terminal block connector 10 in a lighting fixture. For example, in some embodiments the fastener may engage a boss within the lighting fixture. One or more fastener openings may also be provided, for example, on an opposite end of terminal block connector 10, exteriorly of outer wall 26D.

Although fastener openings 24A, 24B are illustrated herein, one of ordinary skill in the art having had the benefit of the present disclosure will recognize and appreciate that in alternative embodiments terminal block connector 10 may be affixed within a lighting fixture utilizing alternative structure and/or methods. For example, in some embodiments adhesive may be utilized, terminal block connector 10 may include a boss that receives a fastener extending through other structure of a lighting fixture, and/or terminal block connector 10 may include snap fit structure that may interface with corresponding structure of a lighting fixture.

A live connection block 30 is provided atop the mounting surface 22 and is interposed between walls 26A and 26B. The live connection block 30 includes a live connection input 31 and a live connection output 33 (FIG. 3) that are in electrical communication with one another. The live connection output 33 may optionally have a configuration that is similar to the live connection input 31. In the depicted embodiment, the live connection input 31 and live connection output 33 are in communication with a common throughway extending therebetween. A live input clamping screw 32 is provided adjacent the live connection input 31 and is adjustable within the throughway to thereby clamp and retain wiring inserted through live connection input 31. The clamping screw 32 is adjustable along a longitudinal axis thereof that is generally perpendicular to the longitudinal axis of the throughway extending between the live connection input 31 and live connection output 33. Similarly, a live output clamping screw 34 is provided adjacent the live connection output 33 and is axially adjustable within the throughway to thereby clamp and retain wiring inserted through live connection output 33.

A neutral connection block 35 is provided atop the mounting surface 22 and is interposed between walls 26B and 26C. The neutral connection block 35 includes a neutral connection input 36 and a neutral connection output 38 (FIG. 3) that are in electrical communication with one another. The neutral connection output 38 may optionally have a configuration that is similar to the neutral connection input 36. The neutral connection input 36 and neutral connection output 38 are in communication with a common throughway extending therebetween in the depicted embodiment. A neutral input clamping screw 37 is provided adjacent the neutral connection input 36 and is adjustable within the throughway to thereby clamp and retain wiring inserted through neutral connection input 36. Similarly, a neutral output clamping screw 39 is provided adjacent the neutral connection output 38 and is axially adjustable within the throughway to thereby clamp and retain wiring inserted through neutral connection output 38.

A ground connection block 40 is provided atop the mounting surface 22 and is interposed between walls 26C and 26D. The ground connection block 40 includes a ground connection input 41 and a ground connection output 43 (FIG. 3) that are in electrical communication with one another. The ground connection output 43 may optionally have a configuration that is similar to the ground connection input 41. In the depicted embodiment, the ground connection input 41 and ground connection output 43 are in communication with a common throughway extending therebetween. A ground input clamping screw 42 is provided adjacent the ground connection input 41 and is adjustable within the throughway to thereby clamp and retain wiring inserted through ground connection input 41. Similarly, a ground output clamping screw 44 is provided adjacent the ground connection output 43 and is axially adjustable within the throughway to thereby clamp and retain wiring inserted through ground connection output 43.

In the depicted embodiment substantially the entirety of each of the connection blocks 30, 35, and 40 is conductive. As described in detail herein, at least a portion of each of the connection blocks 30, 35, and 40 is in communication with a portion of surge protection structure within housing base 20. For example, an opening may be provided through mounting surface 22 underneath each of connection blocks 30, 35, and 40 and may enable electrical connectivity between the surge protection structure and the connection blocks 30, 35, and 40. For example, conductive structure of each of connection blocks 30, 35, and 40 may extend through respective of the openings and electrically contact the surge protection structure. Also, for example, conductive structures of the surge protection structure may extend through respective openings and electrically contact of each of connection blocks 30, 35, and 40. For example, conductive structures of the surge protection structure may be soldered to connection blocks 30, 35, and 40 and/or may extend into a receptacle of connection blocks 30, 35, and 40. Also, for example, intermediary conductive structure may be provided that extends between surge protection structure and connector blocks 30, 35, and 40.

Although specific connection blocks 30, 35, and 40 are illustrated herein and specific placement of connection blocks 30, 35, and 40 are illustrated herein, one of ordinary skill in the art having had the benefit of the present disclosure will recognize and appreciate that in alternative embodiments one or more alternative connection blocks may be provided and/or may be alternatively positioned. For example, in some embodiments an unobstructed throughway may not extend between connection inputs and connection outputs of the connection blocks. Also, for example, in some embodiments non-conductive structure may be provided around (and/or included with) the connection blocks to electrically shield portions thereof. Such non-conductive structure may, for example, prevent inadvertent contact of the connection blocks by a user. Such non-conductive structure may be formed with the connection blocks and/or may be formed as part of the housing. For example, the housing may include non-conductive structure that extends between the walls 26A-C and that substantially blocks the connection blocks with the exception of the input and outputs thereof. Also, for example, in some embodiments alternative input and/or output wire retention structure may be provided. For example, in some embodiments the screws 32, 34, etc. may be replaced with a spring biased clamp. Also, for example, in some embodiments quick connection structure that retains wiring once inserted therethrough may be provided. Such quick connection structure may optionally be tool-less and may optionally allow for releasing of the wiring once inserted or, alternatively, may fixedly and non-releasably retain the wiring. Also, for example, in alternative embodiments the arrangement of the live, neutral, and ground connection may be different.

Referring particularly to FIG. 3, terminal block connector 10 is depicted schematically—electrically interposed between a power source 2 and LED lighting fixture electronics 60. Live, neutral, and ground wiring of power source 2 is depicted connected to respective of live connection input 31, neutral connection input 36, and ground connection input 41. An embodiment of surge protection structure is depicted in FIG. 3 and consists of a plurality of varistors 51, 52, 53, and 54. The varistors 51, 52, 53, and 54 may be enclosed within the housing base 20 in some embodiments and be in electrical communication with selective terminal blocks 30, 35, and 40 as described via one or more openings and/or conductive structures of the housing.

The housing base 20 may optionally include an actuable door or other actuable structure to provide selective access to the varistors 51, 52, 53, and 54 in some embodiments. For example, a door may be attached with screws and/or may be slidably attached. In other embodiments the housing base 20 may be sealed so as to prevent access to the varistors 51, 52, 53, and 54 without destroying the housing. For example, in some embodiments the housing base 20 may be polymeric and may be seal welded to non-accessibly enclose the varistors 51, 52, 53, and 54. Also, for example, in some embodiments the housing base 20 may be polymeric and include a door that is attached with irreversible screws to non-accessibly enclose the varistors 51, 52, 53, and 54. In some embodiments the housing may be polymeric and may have resistance to physical and thermal stress. In some of those embodiments the housing may have a United Laboratories (UL) rating of at least 5VA. In some embodiments an LED or other indicator may be included with the terminal block connector 10 and may be electrically coupled with one or more of the varistors 51, 52, 53, and 54 to provide information regarding the status thereof. For example, the LED may be lit when one or more of the varistors 51, 52, 53, and 54 is damaged or not working, thereby notifying a user that the varistor(s) 51, 52, 53, 54 or the terminal block connector 10 needs to be replaced. Additional circuitry may optionally be utilized to determine the status of the varistor(s) 51, 52, 53, and/or 54.

The first varistor 51 and the second varistor 52 are each electrically connected between the live connection block 30 and the neutral connection block 35. In alternative embodiments only one of the first varistor 51 and second varistor 52 may be provided. The third varistor 53 is electrically connected between the live connection block 30 and the ground connection block 40. The fourth varistor 54 is electrically connected between the neutral connection block 35 and the ground connection block 40. The depicted varistor implementation may provide surge protection in accordance with IEEE/ANSI C62.41.2 recommendations and/or UL 1449 $3^{rd}$ edition certification requirements. In some embodiments the varistors may be Metal Oxide Varistors (MOVs). In some versions of those embodiments the varistors may be ULTRA-MOV MOVS available from Littelfuse, Inc. of Chicago, Ill.

In some embodiments an on/off switch may be implemented in the terminal block connector 10 to enable a user to selectively prevent power output across one or more of outputs 33, 38, and 43. For example, in some embodiments the on/off switch may break the connection between all of inputs 31, 36, and 41 and outputs 33, 38, and 43.

Figure 4:
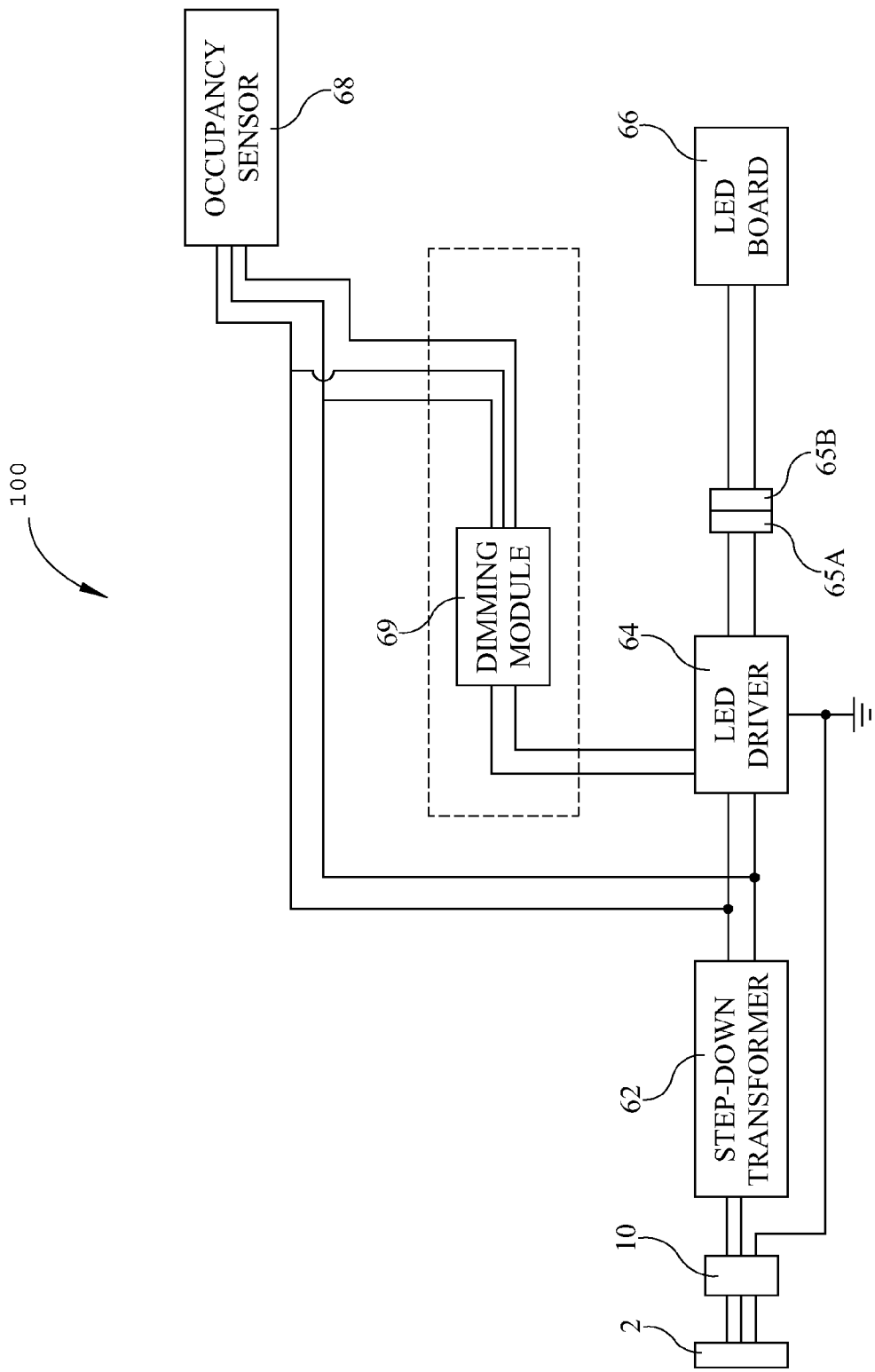
FIG. 4 illustrates a schematic view of a lighting fixture having the terminal block connector of FIG. 1.

Referring to FIG. 4, a schematic view of a lighting fixture 100 having the terminal block connector 10 of FIG. 1 is illustrated. The terminal block connector 10 is electrically coupled to live, neutral, and ground wiring from power source 2 via respective live connection input 31, neutral connection input 36, and ground connection input 41. Wiring electrically connects live connection output 33 and neutral connection output 38 to step-down transformer 62 and electrically connects ground connection output 43 to a ground input of LED driver 64. In alternative embodiments the ground connection output 43 may be electrically connected to a ground connection of step-down transformer 62. The step-down transformer 62 steps down the voltage of power source 2 to a lower voltage and may optionally convert the voltage of power source 2 from AC to DC. The step-down transformer 62 may be omitted in some embodiments of lighting fixture 100.

The step-down transformer 62 is electrically connected to LED driver 64. In some embodiments LED driver 64 may be configured to accept voltage from power source 2 that has not first been stepped down by step-down transformer 62. The LED driver 64 has an electrical connection output 65A that is electrically connected to an electrical connection input 65B of LED board 66. LED board 66 may include one or more LEDs and optionally one or more optical components associated with the LED(s). In alternative embodiments LEDs and/or other light sources may be provided that are not mounted on a board.

An occupancy sensor 68 and a dimming module 69 are also provided in the depicted embodiment of the lighting fixture 100. The occupancy sensor 68 is electrically coupled to the output of the step-down transformer 62 and to an input of the dimming module 69. The dimming module 69 is electrically coupled to the LED driver 64. The dimming module 69 may communicate with the LED driver 64 to operate the LED(s) at a desired brightness. The dimming module 69 may also communicate the status of the occupancy sensor 68 to the LED driver 64 to selectively operate the LED(s). Although a particular lighting fixture is illustrated herein, one of ordinary skill in the art, having had the benefit of the instant disclosure, will recognize and appreciate that alternative lighting fixtures may incorporate an embodiment of the connector described herein. For example, in some embodiments the lighting fixture may not include any LEDs, may not include an occupancy sensor 68, and/or may not include a dimming module 69.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:
1. A lighting fixture, comprising:
a light source;
electronics electrically coupled to and powering said light source;
a terminal block connector, said terminal block connector being within the lighting fixture and having a housing supporting a live connection block, a neutral connection block, and a ground connection block;
said live connection block, said neutral connection block, and said ground connection block each having a high voltage power source input and a lighting fixture electronics output; each said lighting fixture electronics output electrically connected to said power source input;
said lighting fixture electronics output of at least said live connection block and said neutral connection block electrically connected to said electronics; said terminal block connector further including a first varistor electrically connected between said live connection block and said neutral connection block, a second varistor electrically connected between said live connection block and said ground connection block, and a third varistor electrically connected between said neutral connection block and said ground connection block;
wherein said first varistor, said second varistor, and said third varistor are inaccessibly enclosed within said housing.

2. The lighting fixture of claim 1, wherein said electronics include an LED driver.

3. The lighting fixture of claim 1, wherein said electronics include a step-down transformer electrically interposed between said terminal block connector and said LED driver.

4. The lighting fixture of claim 3, wherein said electronics include an occupancy sensor.

5. The lighting fixture of claim 1, wherein said first varistor, said second varistor, and said third varistor may not be physically contacted without destroying said housing.

6. The lighting fixture of claim 1, wherein said first varistor, said second varistor, and said third varistor may not be physically contacted without disassembling said housing.

7. The lighting fixture of claim 1, wherein said terminal block connector further includes a fourth varistor electrically connected between said live connection block and said neutral connection block.

8. The lighting fixture of claim 1, wherein said light source is LED-based.

9. The lighting fixture of claim 1, wherein said ground connection block (10) is affixed to structure within said lighting fixture.

10. The lighting fixture of claim 3, wherein said ground connection block (40) is electrically connected to said LED driver (64) through said step-down transformer.

11. The lighting fixture of claim 10, wherein said live connection block and said neutral connection block are electrically connected to said LED driver through said step-down transformer and said ground connection block is electrically connected to said LED driver independent of said step-down transformer.

12. The lighting fixture of claim 1, wherein said housing includes a base and said live connection block (30), said neutral connection block, and said ground connection block are all supported atop said base (20).

13. The lighting fixture of claim 7, wherein said varistors are substantially embedded within said base.

* * * * *